US006243702B1

(12) United States Patent
Bamford et al.

(10) Patent No.: US 6,243,702 B1
(45) Date of Patent: Jun. 5, 2001

(54) METHOD AND APPARATUS FOR PROPAGATING COMMIT TIMES BETWEEN A PLURALITY OF DATABASE SERVERS

(75) Inventors: Roger J. Bamford, Woodside; William H. Bridge, Jr., Alameda; J. William Lee, Foster City; Alok Srivastava, Santa Clara, all of CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/102,724

(22) Filed: Jun. 22, 1998

(51) Int. Cl.[7] ..................................................... G06F 17/30
(52) U.S. Cl. ................................ 707/8; 707/201; 707/10; 707/200; 709/102
(58) Field of Search .................................. 707/201, 200, 707/8, 10; 709/102

(56) References Cited

U.S. PATENT DOCUMENTS

| 5,530,939 | * | 6/1996 | Mansfield, Jr. et al. | 707/201 |
| 5,878,434 | * | 3/1999 | Draper et al. | 707/202 |
| 5,884,327 | * | 3/1999 | Cotner et al. | 707/202 |
| 5,924,094 | * | 7/1999 | Sutter | 707/10 |
| 5,956,713 | * | 9/1999 | Banford et al. | 707/8 |
| 5,963,959 | * | 10/1999 | Sun et al. | 707/200 |

OTHER PUBLICATIONS

Dias et al., Integrated Concurency–Coherency Controls for Multisystem Data Sharing, IEEE electronic library, pp. 437–448, Apr. 1989.*

Pilarski et al., Checkpointing for Distributed databases: Starting from the Basics, IEEE electronic library, pp. 602–610, Sep. 1992.*

* cited by examiner

*Primary Examiner*—Jean R. Homere
*Assistant Examiner*—Greta L. Robinson
(74) *Attorney, Agent, or Firm*—Hickman Palermo Truong and Becker LLP; Carl L. Brandt

(57) ABSTRACT

A method and system for removing propagation delays between a plurality of database servers that have access to a common database is provided. According to the method, each database server is associated with a logical clock. In response to initiating a commit of a transaction executing on a database server, a commit time for the transaction is determined and broadcast to one or more other database servers. The broadcast is overlapped with a transaction log force. Upon receiving the commit time, the database servers compare the transmitted commit time to the time indicated by their logical clock. If the commit time is greater than the time indicated by their logical clock, the database server sets its logical time to reflect a time that is at least as recent as the time reflected by the transmitted commit time.

6 Claims, 9 Drawing Sheets

METHOD AND APPARATUS FOR PROPAGATING COMMIT TIMES BETWEEN A PLURALITY OF DATABASE SERVERS

FIELD OF THE INVENTION

The present invention relates to computer systems and, more specifically, to a method and apparatus for reducing propagation delays in a database system.

BACKGROUND OF THE INVENTION

A database server is the software which is used in managing a database, and a client is an application that requests information from a database server. Each computer in a database system is called a node. A node in a distributed database system can perform the functions of a client, a database server, or both. In certain cases, a particular node may perform the functions of multiple database servers, multiple clients, or both. However, for explanation purposes, a node will be described as functioning as a single database server.

A multi-version database system is a database system that manages concurrency control via versions and snapshots of the same database. In a multi-version parallel database system, transactions executing on a plurality of database servers can concurrently access the same database. For a particular transaction, the versions of the data obtained from the database are typically the versions that were current at a particular point in time. The set of all database data that is current as of a particular point in time is commonly termed a "database snapshot".

To provide transactions with database snapshots, a multi-version parallel database system typically stamps each version of data with a logical timestamp. The logical timestamp assigned to a version of data is typically referred to as a version number. When a transaction requires data from a multi-version database, the database server assigns one or more logical timestamps to the transaction. The logical timestamps that are assigned to transactions are commonly called "snapshot times" as they are used to determine the database snapshot that should be used with particular transactions. Snapshot times are generally provided to a transaction through the use of a logical clock that is maintained by each database server.

When a transaction commits, the transaction is assigned another logical timestamp. The logical timestamp assigned upon commit is referred to as the commit time of the transaction. All changes made by a transaction are considered to have been made at the commit time of the transaction. To supply an ordering to changes within a database, the logical clock of a database server is typically incremented after it is assigned as the commit time of a transaction. Consequently, transactions that commit are assigned commit times that are greater than previously committed transactions.

Thus, logical clocks maintained by database servers are used to provide logical timestamps for a variety of reasons (e.g. snapshot times, version numbers, commit times). Because each database server maintains its own logical clock, a transaction may be assigned a snapshot time that causes information to be read that is slightly older than the most current version. However, because the information obtained for a transaction is from a particular database snapshot, the transaction is guaranteed to receive consistent information that was current as of the particular snapshot time.

FIG. 1 depicts a multi-version parallel database system 100 in which a plurality of database servers (104–108) provide snapshot times to transactions for accessing database snapshots from a multi-version database 102. In this example, the multi-version database 102 is represented using a plurality of database snapshots 114. Each database snapshot 114 represents a virtual state of data as it existed in multi-version database 102 as of database logical timestamps T23–T31. In this example, T31 represents the most recent database snapshot of multi-version database 102. Respectively associated with the database servers 104, 106 and 108 are logical clocks 110, 112 and 114. Currently executing on database servers 104, 106 and 108 are transactions 116–118, 120–122 and 124–128. As depicted, each transaction is executing using data from a particular database snapshot.

When a process executing on a database server begins a transaction, the transaction is assigned a particular snapshot time based on the logical clock that is associated with the database server. The snapshot time guarantees that the version of the data items supplied to the process for the transaction will reflect the state of those data items as of the particular snapshot time. For example, if a transaction TX1 is assigned a transaction snapshot time of T1, the process executing the transaction is guaranteed to be supplied with data items that reflect a state as of time T1, even if the data items have been subsequently modified. However while the process is guaranteed to be provided with a consistent set of data items from the database as of the snapshot time, the process may see information that is slightly older than the most current version of the database.

A transaction is considered committed after its changes are made persistent in the database. In certain systems, to commit a transaction, the transaction requests the database server on which it is executing to assign it a commit time. The database server then obtains a commit time from its logical clock and assigns it to the transaction. After obtaining the commit time, the logical clock is then incremented. A log force is then initiated. The log force writes information (redo records) describing the changes made by the transaction to disk. Once the log force is complete, the changes are made persistent in the database. The database may then report to the user that the transaction is committed.

For example, when transaction 120 began executing on database server 106, the database server 106 accessed its logical clock 112 and assigned transaction 120 a snapshot time of T26. Based on a snapshot time of T26, the transaction 120 is provided with a database snapshot 114 as of the logical timestamp T26. Thus, transaction 120 is guaranteed that it will see a consistent set of data from the multi-version database 102 as of snapshot time T26. When transaction 120 completes and is ready to commit, the database server 106 will assign transaction 120 a commit time based on the current value of its logical clock 112. For example, the logical clock 112 of database server 106 may have incremented to a logical time value of T30. Transaction 120 would then be assign a commit time of T30 for committing its changes to the multi-version database 102. These changes can then be seen by transactions that are assigned a snapshot time of T30 or greater.

Because each database server maintains its own logical clock, whether a particular transaction will see a particular change made to the database depends not only on the current logical clock value associated with the database server in which the transaction is executing, but also on the logical clock values that are associated with the other database servers of the database system. Thus, by having each database server maintain its own logical clock, a time dependency is formed between the transactions executing on different database servers of the database system. This time dependency causes a propagation delay to be introduced into the database system that can cause updates that occurred prior to reading the database not to be seen.

A maximum propagation delay period is the maximum interval of time for which changes committed by transaction executing on one database server are propagated to the transactions executing on other database servers of the database system. This maximum propagation delay period guarantees that if a transaction commits changes from one database server, that the committed changes will be seen by all other database servers of the system if a query is performed after the maximum propagation delay period. Thus, if the maximum propagation delay period is greater than zero, then the changes caused by a transaction committing on one database server are not guaranteed to be seen by other database servers if a query is performed after the transaction commits but before the maximum propagation delay period expires.

For example, a husband may make a deposit into an account A using transaction 118. If when the transaction 118 completes it is assigned a commit time of T31 by database server 104, when the changes are written into the multi-version database 102 they will have a database logical timestamp of T31. If after transaction 118 commits, the husband's wife attempts to obtain the balance of account A using transaction 120 on database server 106, because transaction 120 was assigned a snapshot time of T26 by database server 106, the balance of account A will not reflect the prior deposit that was made by the husband. Therefore, as long as the logical clock 112 is less than T31, any transaction that is assigned a snapshot time on database server 106 will not see the changes made to the multi-version database 102 by transaction 118.

One method of reducing the maximum propagation delay period in a multi-version parallel database system is by synchronizing the logical clocks associated with each database server on a periodic basis. For example, the propagation delay period can be reduced to a maximum of three seconds by having a centralized process periodically requesting each database server to send its current logical clock's time value every three seconds. After receiving the logical clock values, the centralized process can then determine the greatest time value and send it to each database server of the system. Each database server then uses the delivered time value to cause its own logical clock to represent a time that is at least as great (i.e. recent) as the delivered time value.

Having a central process that synchronizes the logical clocks associated with each database server on a periodic basis can be used to reduce the maximum propagation delay period to a certain point. However, as the synchronizing period is reduced to achieve a smaller maximum propagation period, the overhead associated with constantly sending messages to each database server quickly becomes unreasonable. In addition, in certain systems, it is imperative to maintain a maximum propagation delay of zero to prevent data anomalies. However, using a central process for sending messages to periodically synchronize the logical clocks associated with each database server can not completely eliminate the propagation delay as there will always be a period of time when the logical clocks are not synchronized.

One approach to implementing a maximum propagation delay of zero in a multi-version parallel database system is by requiring each database server to consult a global logical clock service to obtain a most recent logical time value (timestamp) for its logical clock before it assigns a snapshot time to a transaction. For example, one database server, called a global clock service, can be assigned the task of running a global clock. When other database servers need to assign a transaction a snapshot time, they send a message to the global clock service requesting a timestamp. Upon receipt of such messages, the global clock service would generate a timestamp, either by reading its hardware clock or, more easily, by incrementing a software-based serial number counter, and send the timestamp to the requester.

This approach is known as the "on-demand" approach and is in common use today. However, the "on-demand" approach has a substantial drawback. As the system grows, a greater number of database servers must communicate with the global clock server. As a result, more time is spent waiting for the global clock server to handle all the requests. Certain improvements to the global clock server approach can be made. However, the basic design is ultimately limited by the single global point of timestamp generation, which can become a performance bottleneck for the entire system. In addition, and possibly more importantly, each process executing a transaction is required to block itself while waiting for a timestamp to be obtained from the global clock, thus causing a context switch to occur. These context switches typically require several thousand instructions and thus inducing a large amount of overhead into a database system.

Based on the foregoing, it is highly desirable to provide a mechanism for implementing a multi-node database system having a maximum propagation delay of zero without introducing additional context switching overhead.

SUMMARY OF THE INVENTION

A method and system for removing propagation delays between a plurality of database servers that have access to a common database is provided. According to the method, each database server is associated with a logical clock. In response to initiating a commit of a transaction executing on a database server, a commit time for the transaction is determined and broadcast to one or more other database servers. Upon receiving the commit time, the database servers compare the transmitted commit time to the time indicated by their logical clock. If the commit time is greater than the time indicated by their logical clock, the database server sets its logical to reflect a time that is at least as recent as the time reflected by the transmitted commit time.

According to another aspect of the invention, the node broadcasting the timestamp overlaps the broadcast with a log force.

According to another aspect of the invention, the broadcast commit times are sent as broadcast commit messages which include an unique broadcast ID that can be used to identify a particular broadcast commit message. When a broadcast commit message is received by a database server, the receiving database server sends an acknowledge message to the sending database server that includes the unique broadcast ID.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for removing commit time propagation delays in a multi-version database system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
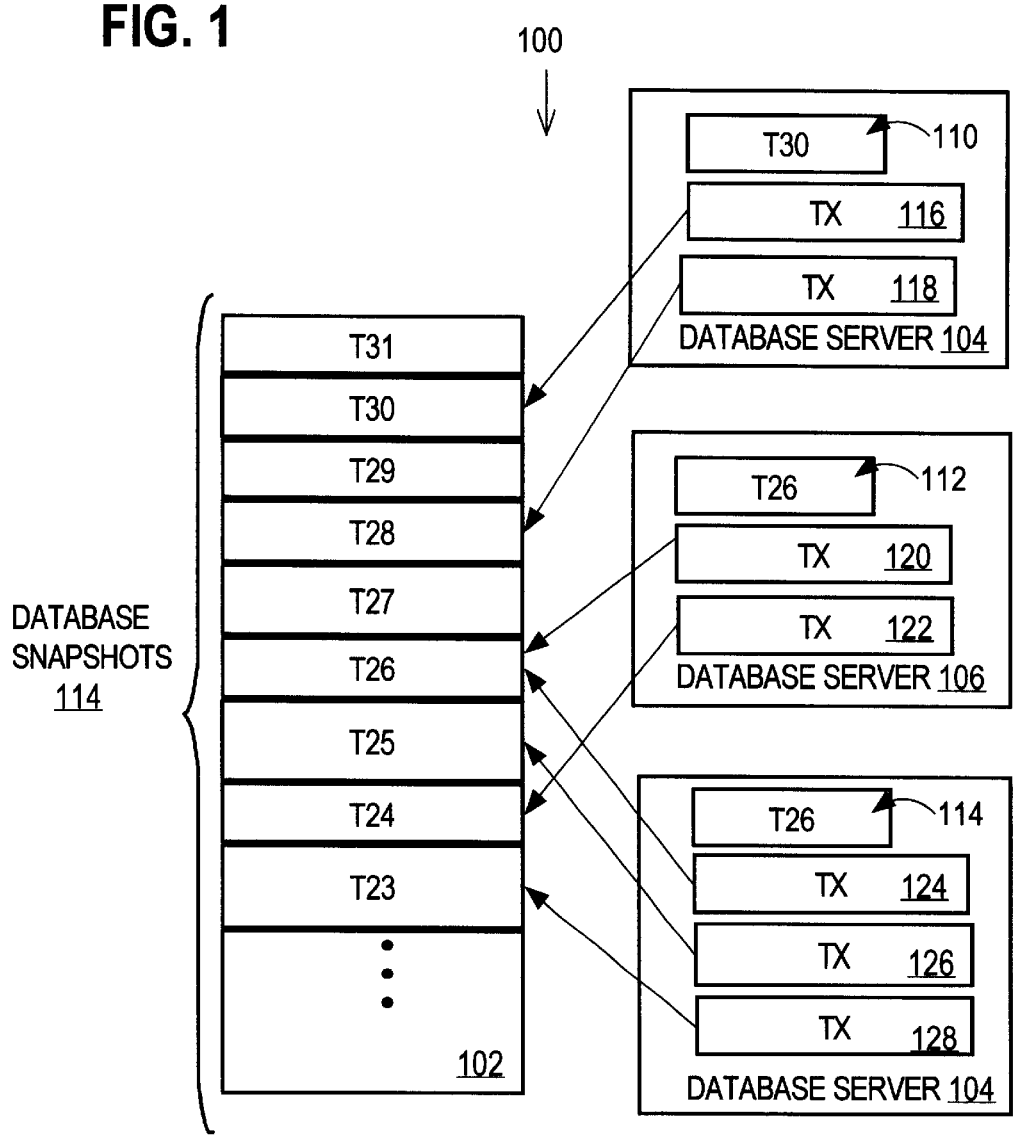
FIG. 1 depicts a multi-version parallel database system in which a plurality of database servers provide snapshot times to transactions for accessing database snapshots from a multi-version database.
Figure 2:
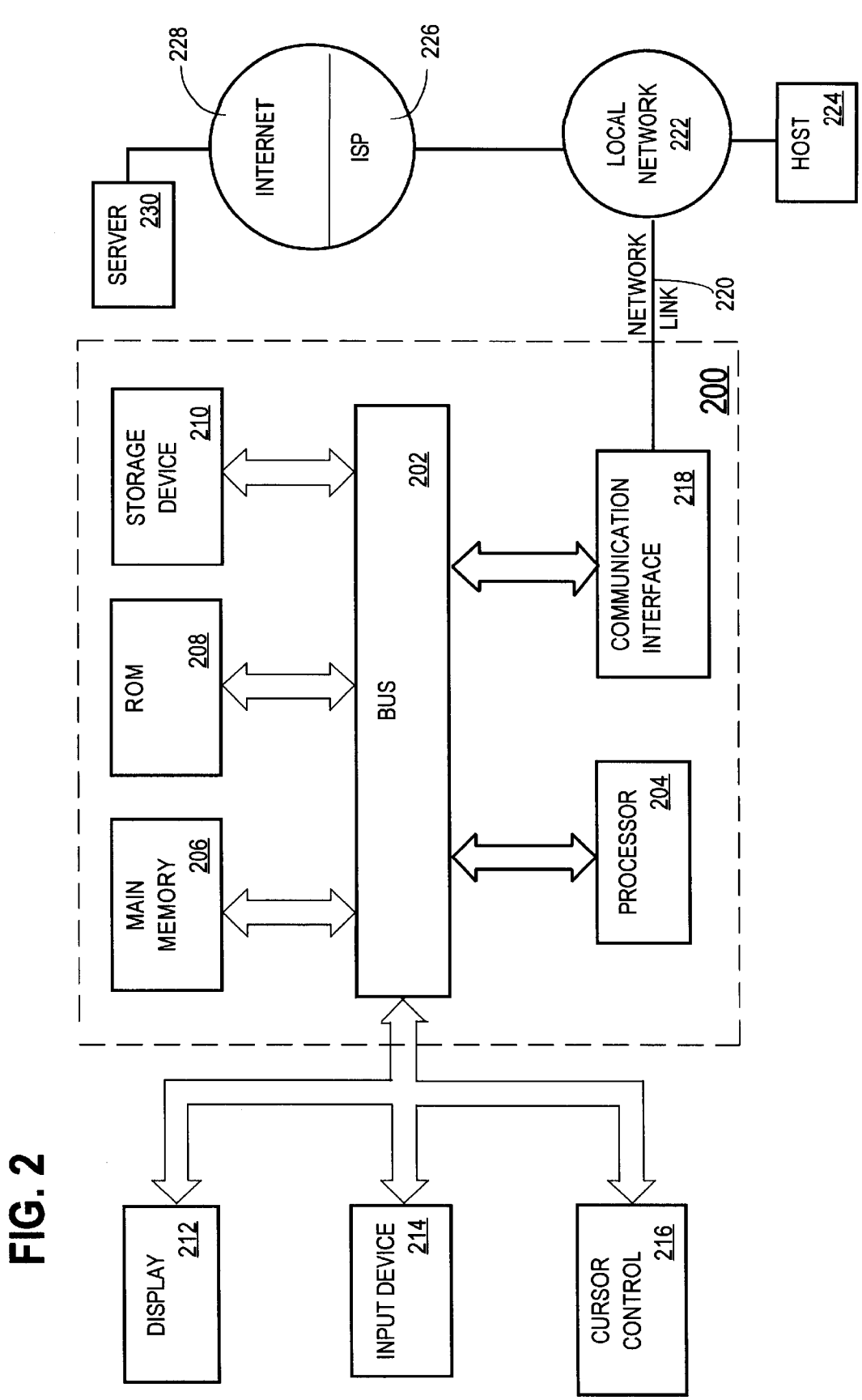
FIG. 2 is a block diagram of a system which may be programmed to implement the present invention.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing a multi-node database system having a commit time propagation delay of zero. According to one embodiment of the invention, a multi-node database system having a commit time propagation delay of zero is provided by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for a multi-node database system having a commit time propagation delay of zero as described herein.

The received code may be executed by processor 204 as it is received, and/or stored in storage device 210, or other non-volatile storage for later execution. In this manner, computer system 200 may obtain application code in the form of a carrier wave.

Functional Overview

The present invention provides a mechanism for removing commit time propagation delays in a multi-version database system. In certain embodiments, when the committing of a transaction (commit transaction) is initiated by a process executing on a database server of a database system, a commit time is broadcast to the other database servers of the database system. Upon receiving the commit time, each database server compares the received commit time with its own logical clock. If the received commit time indicates a time that is greater (i.e. more recent) than the database server's logical clock, the database server updates its logical clock to indicate a time that is at least as great (i.e. as recent) as the received commit time. Upon receiving a commit time, each database server acknowledges receipt of the timestamp by returning an acknowledge message to the sending database server that indicates that the commit time was received.

Once the sending database server receives an acknowledge message from the database servers, the changes caused by the committing transaction are written into the multi-version database and assigned a version number based on the previously broadcast commit time. By causing the logical clock of each database server to be at least as recent as the broadcast commit time, processes executing transactions on the database servers that are assigned a snapshot time after the changes are written into the multi-version database are guaranteed to see the changes.

Figure 3:
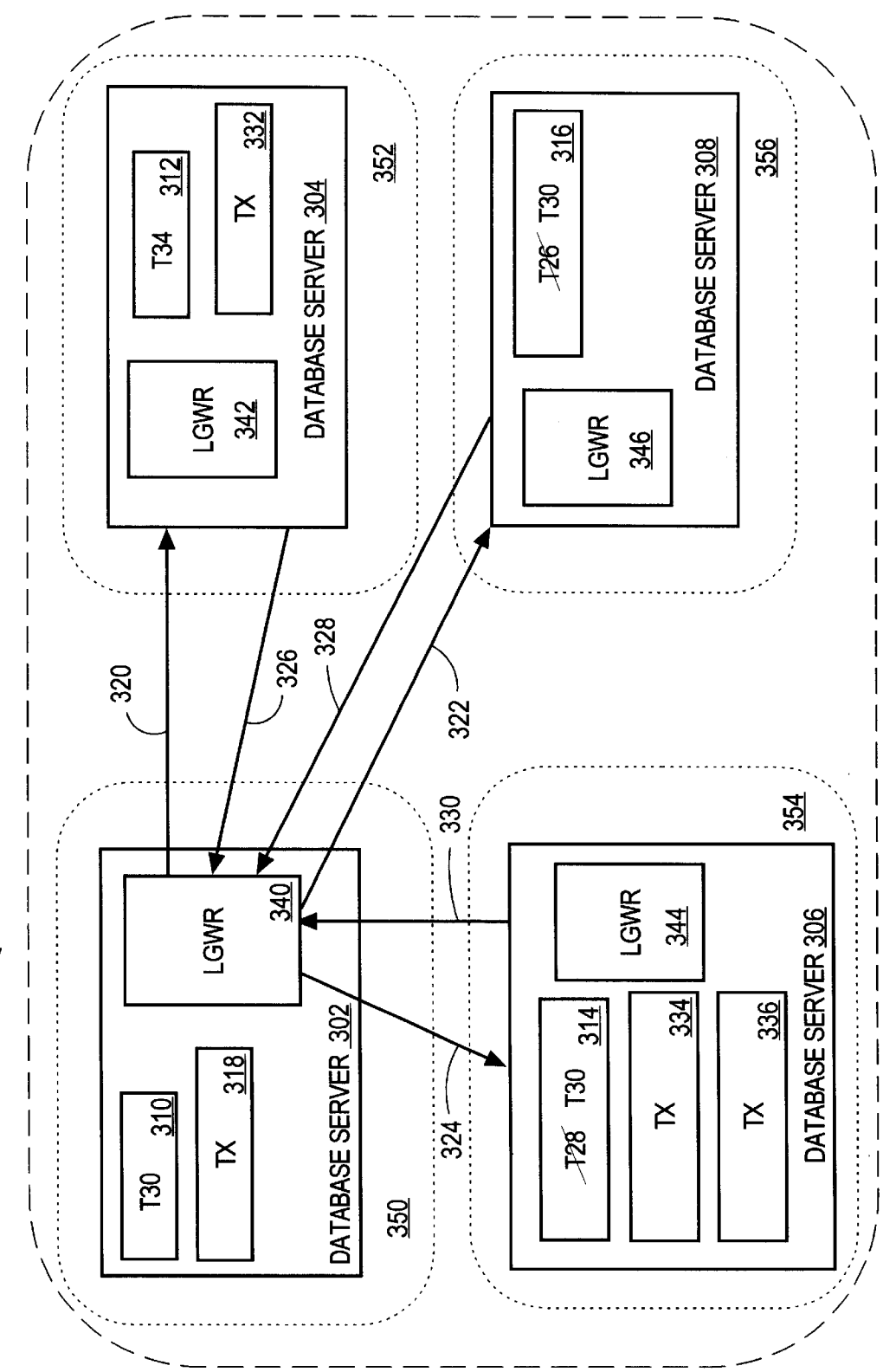
FIG. 3 is a block diagram that illustrates the broadcasting of a transaction commit time to a plurality of database servers within a database cluster in accordance with an embodiment of the invention.

FIG. 3 is a block diagram that illustrates the broadcasting of a transaction commit time to a plurality of database servers within a database cluster 300 in accordance with an embodiment of the invention. As depicted in FIG. 3, database cluster 300 contains a plurality of database servers 302, 304, 306 and 308 which are respectively associated with logical clocks 310, 312, 314 and 316. The plurality of database servers 302, 304, 306 and 308 have access to a multi-version database which is not shown in FIG. 3.

In this example, the database servers 302, 304, 306 and 308 are each respectfully executing on separate nodes 350, 352, 354 and 356. In other embodiments, two or more of database servers 302, 304, 306 and 308 are executing on the same node. As depicted, a LOG WRITER (LGWR) process 340, 342, 344 and 346 respectfully executes on each node 350, 352, 354 and 356. In certain embodiments, the LOG WRITER processes 340, 342, 344 and 346 execute as background processes and are responsible for causing the change information that was generated by a committed transaction to be written into the database.

In this example, a process executing a transaction 318 on database server 302 has begun to commit. In initiating the commit, transaction 318 was assigned a commit time of T30 by database server 302 based on the current value of its logical clock 310. Broadcast commit messages 320, 322 and 324 represent messages containing the commit time of T30 that were sent to database servers 304, 306 and 308. Acknowledge messages 326, 328 and 330 represent messages that were sent by the database servers 304, 306 and 308 to acknowledge the receipt of the broadcast commit messages 320, 322 and 324.

Figure 4:
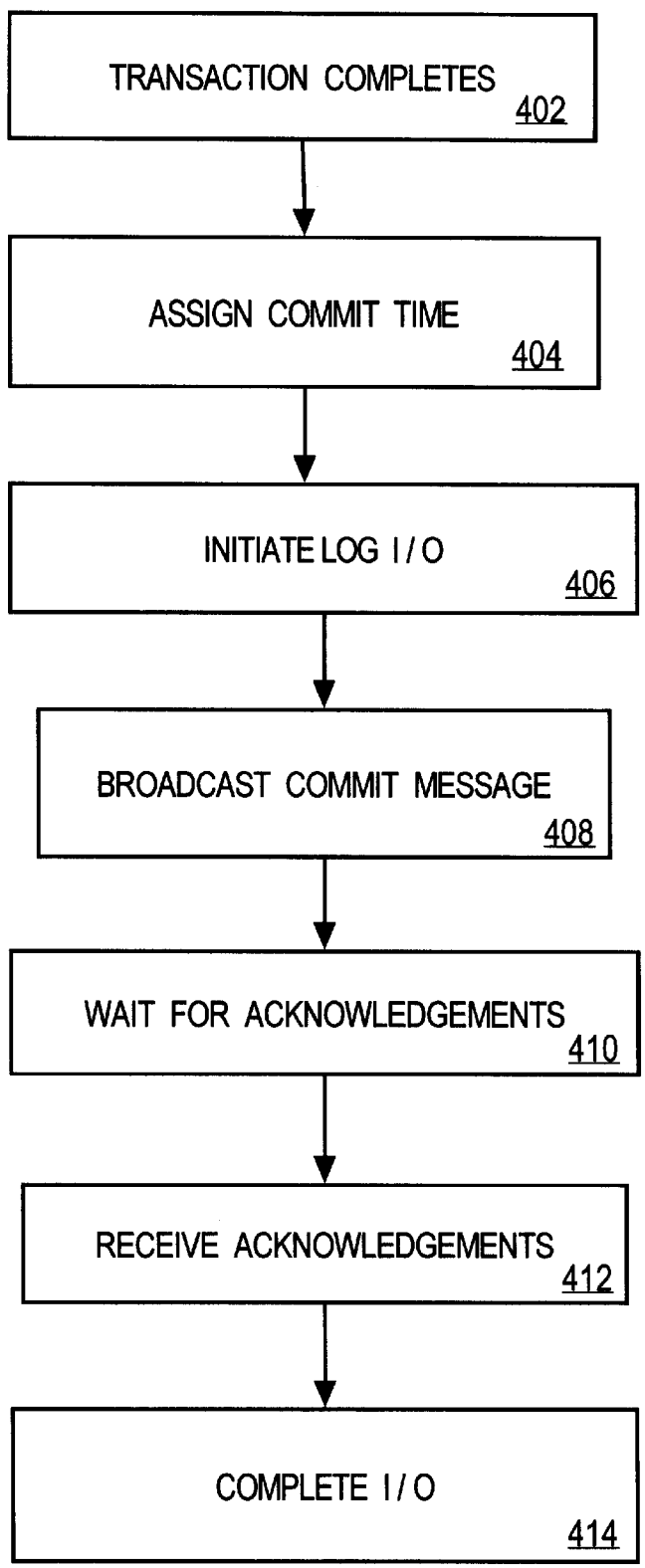
FIG. 4 is flow diagram illustrating the broadcasting of commit times between database servers in accordance with an embodiment of the invention.

FIG. 4 is flow diagram illustrating the broadcasting of commit times between database servers in accordance with an embodiment of the invention. The flow diagram of FIG. 4 will be described in reference to FIG. 3.

At step 402, a transaction executing on a database server completes. For explanation purposes, it shall be assumed that the transaction 318 executing on database server 302 completes.

At step 404, the process executing the transaction requests that the transaction be committed. The transaction (commit transaction) is then assigned a commit time based on the logical clock associated with the database server. For example, transaction 318 is assigned a commit time of T30 based on the logical clock 310 of database server 302.

At step 406, a log I/O is initiated to cause the changes made by the commit transaction to be written to the database. In certain embodiments, the process executing the transaction requests a LOG WRITER (LGWR) process to initiate the log I/O. In one embodiment, after requesting the LGWR process to initiate the I/O, the process executing the transaction waits for the LGWR process to indicate that the log I/O has completed. In certain embodiments, the LGWR process executes as a background process within the database server in which the commit transaction executed. In an alternative embodiment, the LGWR process executes outside the database server.

At step 408, the commit time that was assigned to the committing transaction is broadcast to the other database servers of the database system. In certain embodiments, the LGWR process broadcasts the commit time to the other database servers. For example, LGWR process 340 broadcasts the commit time T30 using broadcast commit messages 320, 322 and 324 to database servers 304, 306 and 308. In certain embodiments, the commit time is broadcast to a daemon process that is executing on each of the database servers 304, 306 and 308.

At step 410, a wait is performed until the other database servers acknowledge the receipt of the broadcast commit time. In certain embodiments, the LGWR process 340 waits for the acknowledgment messages from the other database servers.

At step 412, acknowledgment messages are received from the other database servers. For example, acknowledge messages 326, 328 and 330 are received from database servers 304, 306 and 308. In certain embodiments, the LGWR process 340 receives the acknowledge messages from the other database servers. In one embodiment, a daemon process receives the acknowledge messages from the other database servers. The daemon process then informs the LGWR process 340 when an acknowledge message has been received from all the database servers to whom the commit time was broadcast.

At step 414, after receiving acknowledgments from the database servers that were broadcast commit times, the log I/O is completed. In completing the log I/O, the changes made by the commit transaction are persistently stored in the database. In certain embodiments, the LGWR process waits for the log I/O to complete and then notifies the process executing the transaction. Once the log I/O completes, the commit transaction is considered committed.

Updating the Logical Clocks of Database Servers

When a database server receives a broadcast commit message from another database server, it compares the commit time contained in the message with the current time value of its own logical clock. If the received commit time is greater (i.e. more recent) than the current time value of its own logical clock, the logical clock is updated to reflect a time value that is at least as great (recent) as the received commit time. The database server then sends an acknowledge message back to the database server that broadcast the commit time to indicate that the broadcast commit message was received.

Figure 5:
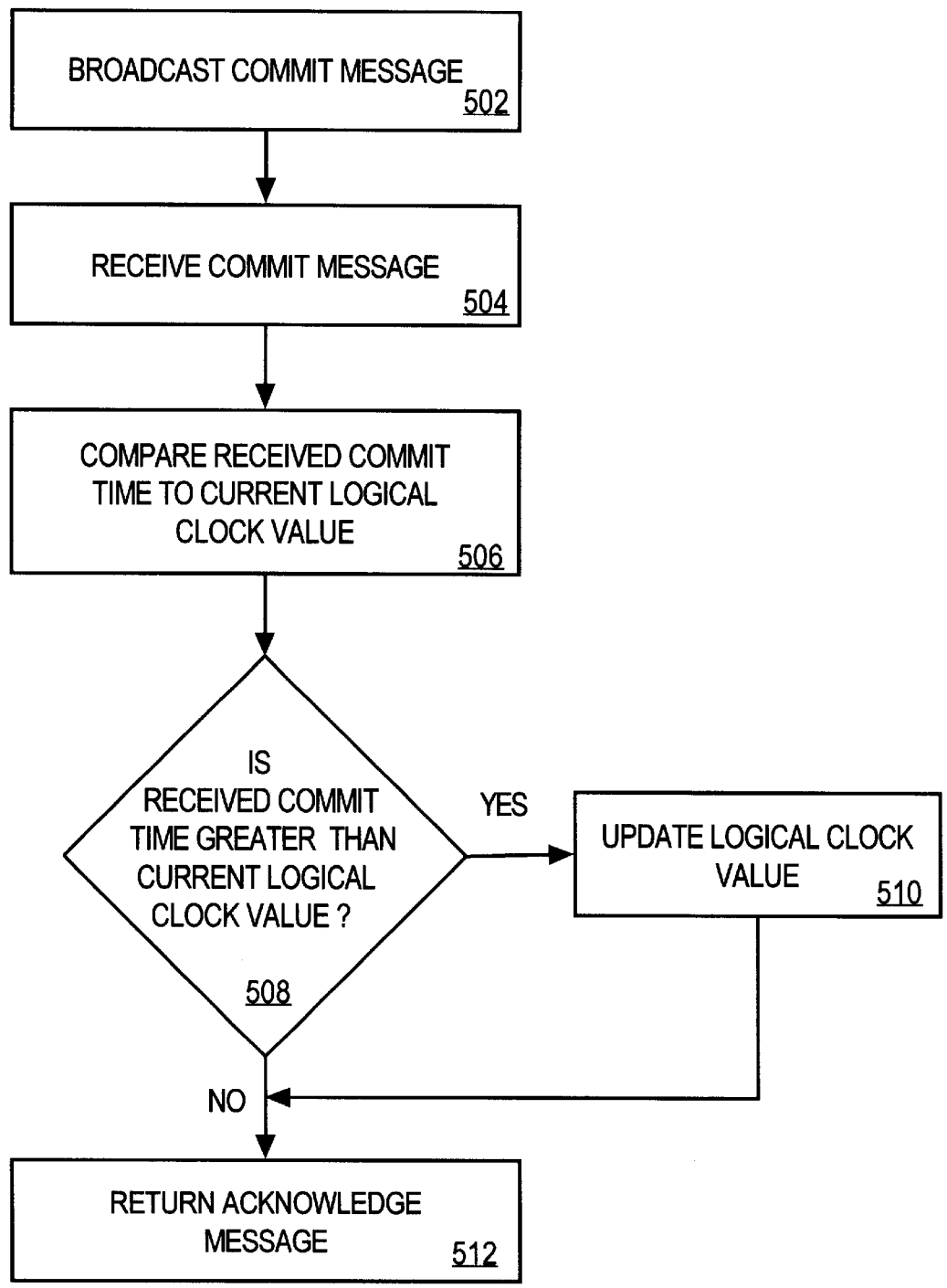
FIG. 5 is a flow diagram illustrating the updating of a database server's logical clock in accordance with an embodiment of the invention.

FIG. 5 is a flow diagram illustrating the updating of a database server's logical clock in accordance with an embodiment of the invention. The flow diagram of FIG. 5 will be described in reference to FIG. 3.

At step 502, a broadcast commit message that contains a commit time, is broadcast to one or more database servers. For example, the LGWR process 340 broadcasts the broadcast commit messages 320, 322 and 324 to database servers 304, 306 and 308. It shall be assumed that the broadcast commit messages contained a commit time of T30.

At step 504, the broadcast commit message is received by the database server.

At step 506, the database server compares the commit time contained in the broadcast commit message with the current time value of its own logical clock. For example, database server 308 compares the received commit time T30 to the current time value of its logical clock 316.

At step 508, if the database server determines that the received commit time is not greater than the current time value of its logical clock, then control proceeds to step 512.

However, if at step 508 the database server determines that the received commit time is greater than the current time value of its logical clock, then at step 510, its logical clock is updated to reflect a time value that is at least as great (recent) as the received commit time. For example, when database server 308 receives the broadcast commit message 322 containing a commit time of T30, its logical clock 316 is updated to T30 so as to be at least as great as the received commit time of T30. However, when database server 304 receives the broadcast commit message 320 containing a commit time of T30, its logical clock 312 is not updated as it is already at least as great as the received commit time of T30.

At step 512, the database servers send an acknowledge message back to the database server that broadcast the commit time. For example, database server 308 returns an acknowledge message 328 back to database server 302 to indicate that the broadcast message was received.

Communicating the Commit Times to Database Servers

Figure 6:
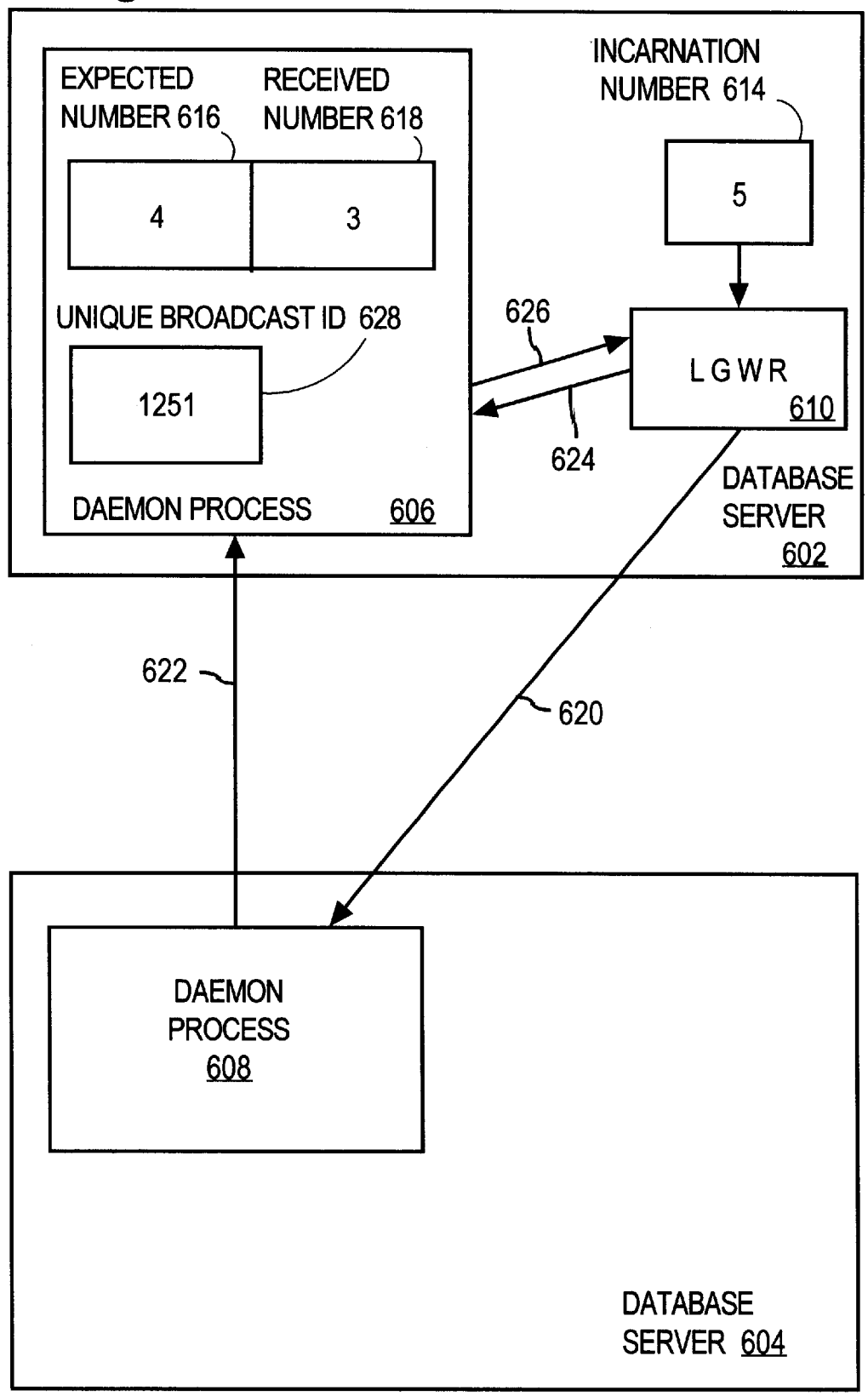
FIG. 6 is a block diagram that illustrates the communication of a commit time between database servers according to an embodiment of the invention.

FIG. 6 is a block diagram that illustrates the communication of a commit time between database servers according to an embodiment of the invention. FIG. 6 depicts database servers 602 and 604, each containing components for illustrating the communication between two database servers. As depicted, database server 602 contains a daemon process 606, a LGWR process 610, and an incarnation number 614. Contained within the daemon process 606 is an expected number 616, a received number 618, and a broadcast ID 628.

The LGWR process 610 is responsible for broadcasting commit times to the other database servers. The daemon process 606 receives acknowledgement messages back from the other database servers. The broadcast ID 628 is used to store an unique ID that can be used to determine whether a particular acknowledgment message 622 corresponds to a particular broadcast commit message 620. The expected number 616 stores a value that represents the number of database servers that are expected to acknowledge the receipt of a particular broadcast commit message. The received number 618 stores the number of acknowledgements that are received back from the database servers for a particular broadcast commit message.

The incarnation number 614 is used as an indicator for determining whether the configuration of the cluster in which database server 602 resides has changed. In certain embodiments, a process is used to continually monitor the cluster configuration and to update the incarnation number 614 whenever a cluster configuration change is detected. In one embodiment, the incarnation number 614 is incremented whenever a cluster configuration change is detected. For example, if the incarnation number 614 contains the value "5", it will be incremented to "6" if a database server is added or removed from the cluster configuration.

Executing in database server 604 is a daemon process 608 which is responsible for receiving the broadcast commit message 602 and for returning an acknowledge message 622 to acknowledge its receipt.

Figure 7:
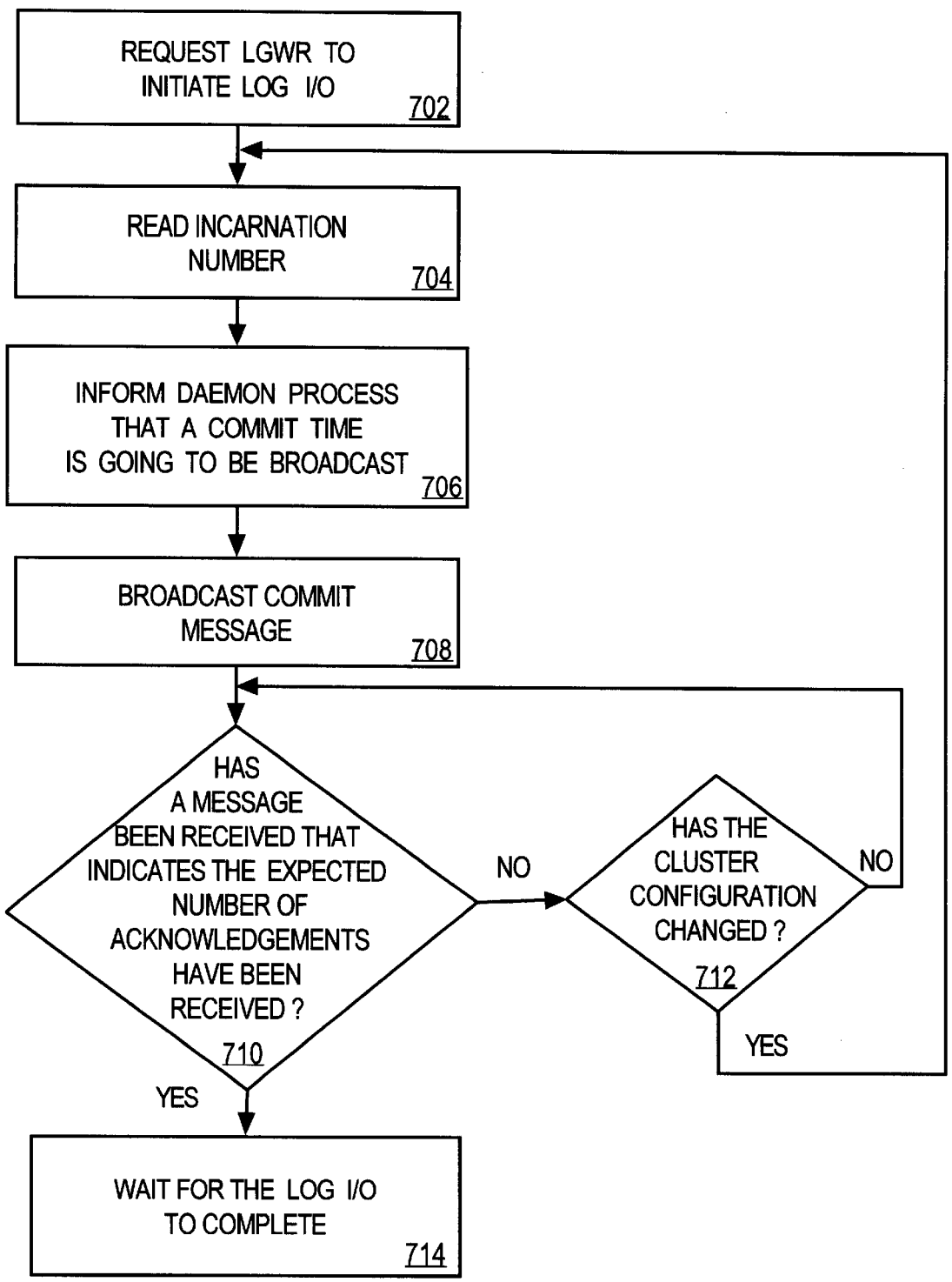
FIG. 7 is a flow diagram illustrating a sequence for broadcasting a commit time to the database servers that are contained in a cluster according to an embodiment of the invention.

FIG. 7 is a flow diagram illustrating a sequence for broadcasting a commit time to the database servers that are contained in a cluster according to an embodiment of the invention. The flow diagram of FIG. 7 is described from the view of a LGWR process that has been requested to initiate an log I/O. The flow diagram in FIG. 7 is described with reference to the components illustrated in FIG. 6.

At step 702, a LGWR process 610 is requested to initiate a log I/O.

At step 704, the LGWR process reads the value of incarnation number 614 and stores it in memory.

At step 706, the LGWR 610 sends an "initialize" message 624 to a daemon process 606 executing on the same node, indicating that it is about to broadcast a commit message to the database servers within the cluster. In certain embodiments, the LGWR generates a unique broadcast ID that can be used in determining whether a particular acknowledge message corresponds to a particular broadcast commit message. The unique broadcast ID and a response value are then included in the "initialize" message 624. The unique broadcast ID allows the daemon process 606 to match a particular acknowledgment message with the corresponding broadcast commit message. The response value indicates the number of acknowledge messages, that correspond to the unique broadcast ID, that the daemon process 606 should receive.

At step 708, a broadcast commit message 620 is broadcast from the LGWR process 610 to the other database servers within the cluster configuration. A cluster map which identifies the database servers that are currently active in the cluster is maintained in each node. The LGWR 610 uses the cluster map to determine which database servers are to broadcast the broadcast commit message 620. In certain embodiments, the broadcast commit message includes the unique broadcast ID. In one embodiment, the broadcast commit messages are sent to a daemon process that is executing on each of the other database servers. For example, the broadcast commit message 620 is sent to the daemon process 608 executing in database server 604.

At step 710, the LGWR 610 determines whether the daemon process 606 has sent a "complete" message 626 within a particular amount of time, that indicates that the expected number of acknowledgments for broadcast commit message 620 have been received by the daemon process 606. In certain embodiments, the LGWR 610 goes into a sleep state for a particular period of time while waiting to be notified that the expected number of acknowledgments that correspond to the particular broadcast commit message 620 have been received by the daemon process 606.

If the LGWR 602 is notified within the particular period of time that the expected number of acknowledgments that correspond to the particular broadcast commit message 620 have been received by the daemon process 606, then control proceeds to step 714.

Conversely, if the LGWR 602 is not notified within the particular period of time that the expected number of acknowledgments that correspond to the particular broadcast commit message 620 have been received by the daemon process 606, then at step 712, the LGWR 610 determines whether the cluster configuration has changed. In certain embodiments, to determine whether the cluster configuration has changed, the LGWR 610 reads the value of the incarnation number 614 and compares it with the previously stored incarnation value.

If at step 712 the LGWR 610 determines that the cluster configuration has changed, then the LGWR 610 stores the updated incarnation number and control returns to step 704 to restart the broadcasting sequence as the previous broadcast commit message is no longer valid.

However, if at step 712 the LGWR 610 determines that the cluster configuration has not changed, then control returns to step 710 to wait a particular period of time for the daemon process 606 to send a complete message 626 that indicates that the expected number of acknowledgments for broadcast commit message 620 have been received by the daemon process 606.

At step 714, the LGWR 610 waits for the log I/O to complete.

Figure 8A:
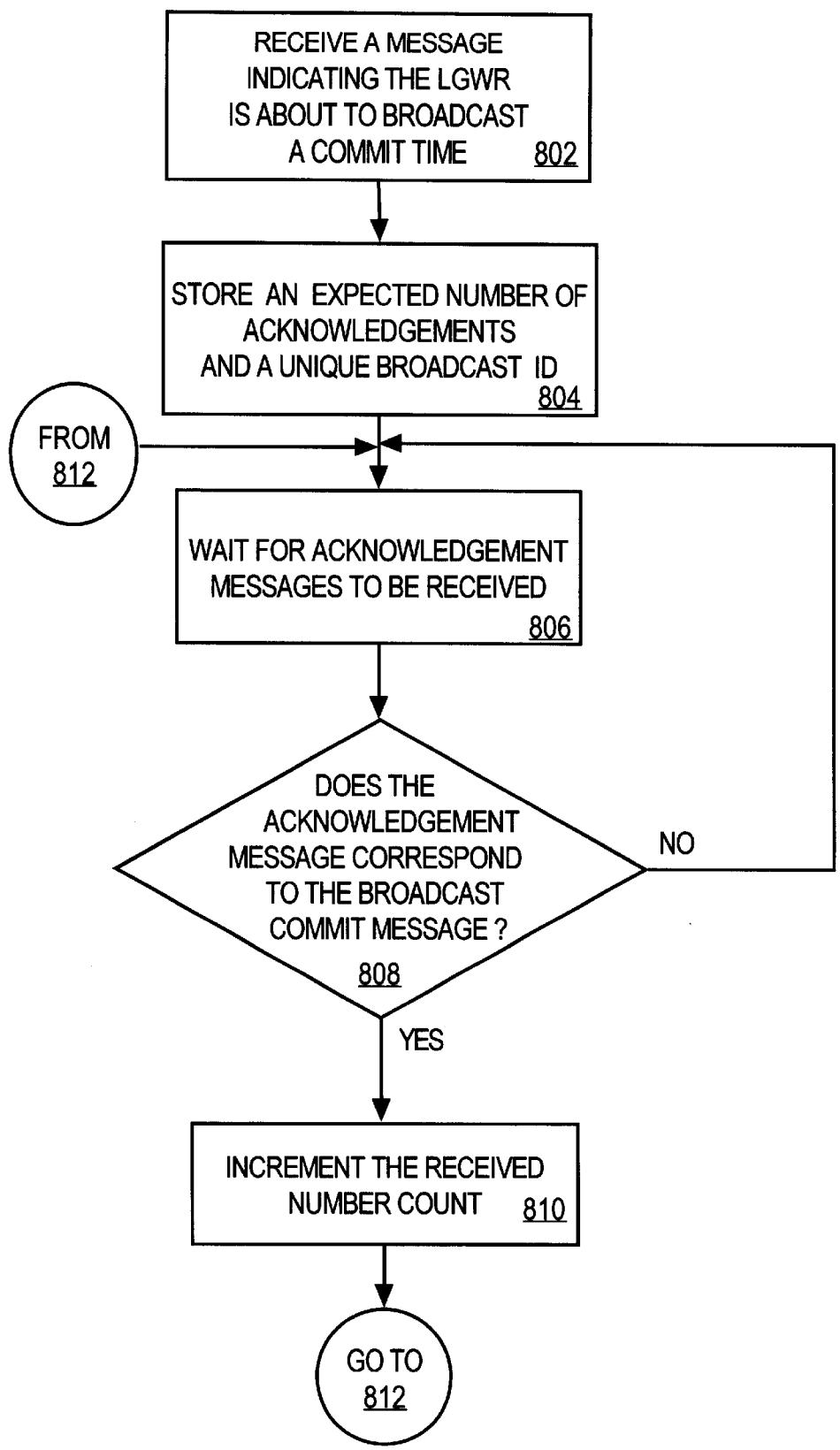
FIG. 8A is a portion of a flow diagram illustrating a sequence for receiving acknowledgment messages from the database servers that are contained in a cluster according to an embodiment of the invention.
Figure 8B:
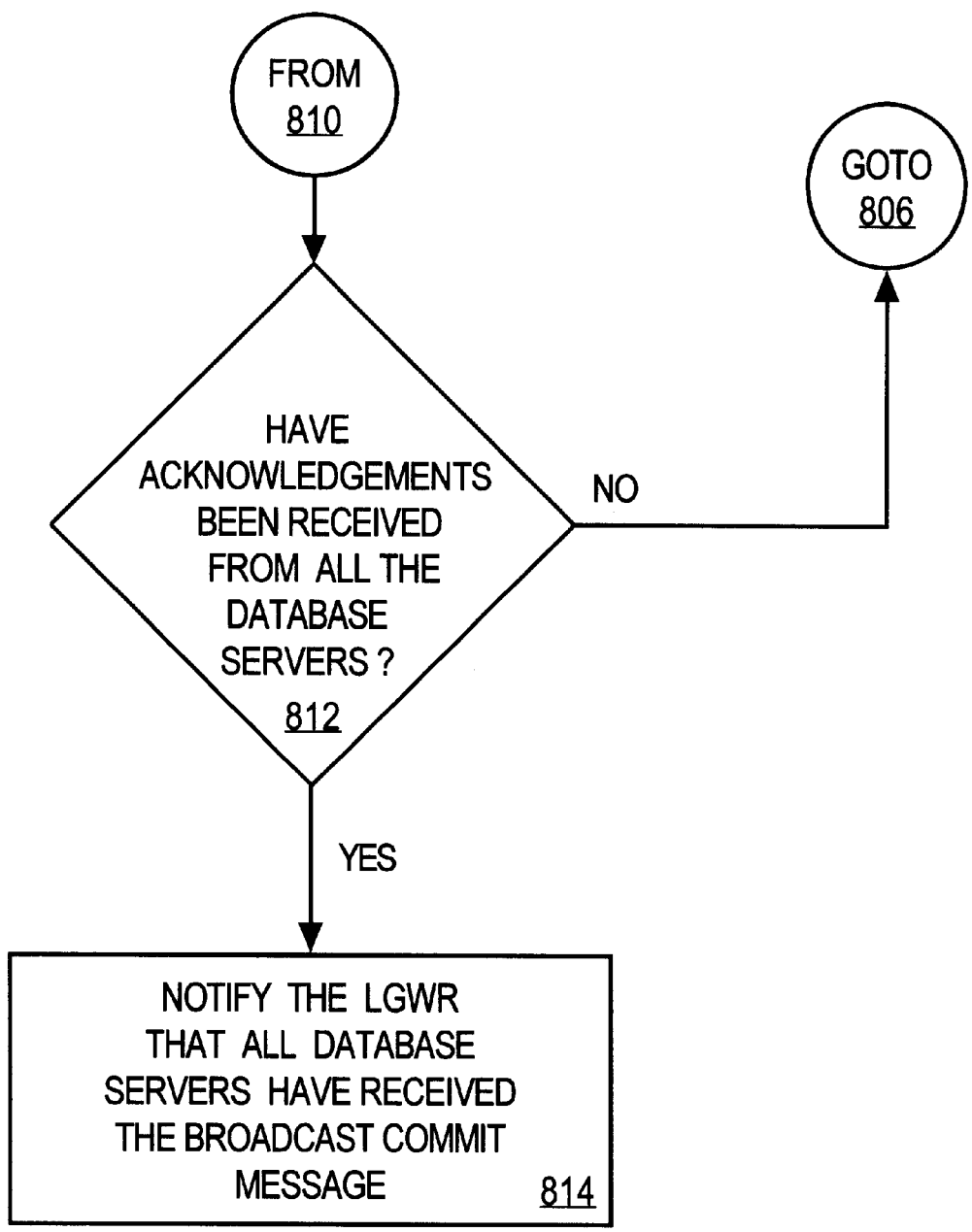
FIG. 8B is another portion of a flow diagram illustrating a sequence for receiving acknowledgment messages from the database servers that are contained in a cluster according to an embodiment of the invention.

FIGS. 8A and 8B is a flow diagram illustrating a sequence for receiving acknowledgment messages from the database servers that are contained in a cluster according to an embodiment of the invention. The flow diagram of FIGS. 8A and 8B is from the view of a daemon process that has received a message indicating that a LGWR is about to broadcast a commit time. The flow diagram of FIGS. 8A and 8B is described using the components of FIG. 6.

At step 802, a daemon process 606 receives a message 624 indicating that the LGWR 610 is about to broadcast a commit time to the database servers within the cluster. In certain embodiments, the message 624 contains a response value that represents the number of expected database server responses and an unique message ID, that will allow the daemon process 606 to match a particular acknowledgment message with a corresponding broadcast commit message.

At step 804, the daemon process 606 stores the response value and unique message ID in memory. In certain embodiments, the daemon process 606 stores the response value as expected number 616 and the unique broadcast ID as broadcast ID 628.

At step 806, the daemon process 606 waits for acknowledge messages to be received from the other database server within the cluster configuration. In certain embodiments, while waiting for acknowledge messages, the daemon process 606 continues to receive and process other types of messages.

At step 808, when the daemon process 606 receives an acknowledge message from a database server, it determines whether the acknowledge message is still valid. In certain embodiments, the acknowledge message received from the database server includes the generated unique broadcast ID that is compared with the broadcast ID 628 to determine if it is a valid acknowledge message.

If at step 808, it is determined that the acknowledge message is not valid, then control proceeds to step 806 to continue waiting for acknowledge messages to be received from the other database server within the cluster configuration.

However, if at step 808, it is determined that the acknowledge message is still valid, then at step 810, the value of received number 618 is incremented.

At step 812, the daemon process compares the value of the expected number 616 to the value of the received number 618 to determines whether a valid acknowledge message has been received from all the database servers within the cluster configuration.

If at step 812 it is determined that a valid acknowledge message has not been received from all the database servers within the cluster configuration, then control proceeds to step 806 to continue waiting for acknowledge messages to be received from the other database server within the cluster configuration.

However, if at step 812 it is determined that a valid acknowledge message has been received from all the database servers within the cluster configuration, then at step 814, the daemon process 606 sends a message 626 to notify the LGWR 610 that a valid acknowledge message has been received from all the database servers within the cluster configuration.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for propagating commit times between a plurality of database servers that have access to a common database, wherein each of said plurality of database servers is associated with a logical clock, the method comprising, the steps of:

in response to initiating a commit of a transaction executing on a particular database server of said plurality of database servers, performing the steps of
determining a commit time for said transaction; and
broadcasting said commit time to one or more other database servers of said plurality of database servers;

in response to receiving the commit time at a receiving database server of the one or more other database servers, causing the receiving database server to perform the steps of
comparing the commit time to a time indicated by the logical clock associated with the receiving database server; and
if the commit time is greater than the time indicated by the logical clock associated with the receiving database server, then setting the logical clock associated with the receiving database server to reflect a time that is at least as recent as the time reflected by the commit time;

after setting the logical clock associated with the receiving database server,
obtaining a snapshot time based on the logical clock associated with the receiving database server;
assigning the snapshot time to a second transaction executing on said receiving database server; and
using the snapshot time to obtain data for said second transaction from a database snapshot, wherein the database snapshot represents a snapshot of data contained in said common database as of a particular point in time.

2. A method for propagating commit times between a plurality of database servers that have access to a common database, wherein each of said plurality of database servers is associated with a logical clock, the method comprising the steps of:

in response to initiating a commit of a transaction executing on a particular database server of said plurality of database servers, performing the steps of
determining a commit time for said transaction; and
broadcasting said commit time to one or more other database servers of said plurality of database servers;

in response to receiving the commit time at a receiving database server of the one or more other database servers, causing the receiving database server to perform the steps of:
comparing the commit time to a time indicated by the logical clock associated with the receiving database server; and
if the commit time is greater than the time indicated by the logical clock associated with the receiving database server, then setting the logical clock associated with the receiving database server to reflect a time that is at least as recent as the time reflected by the commit time;

in response to receiving the commit time at the receiving database server, sending a message from the receiving database server to the particular database server to acknowledge the receipt of the commit time;

wherein the step of broadcasting the commit time to one or more other database servers, includes the step of sending a broadcast commit message to the one or more other database servers, wherein the broadcast commit message includes an unique broadcast ID that can be used to identify the broadcast commit message; and wherein the step of sending the message from the receiving database server to the particular database server includes the step of sending an acknowledge message from the receiving database server to the particular database server, wherein the acknowledge message includes the unique broadcast ID; and receiving an acknowledge message from the receiving database server; extracting the unique broadcast ID from the acknowledge message;

determining whether the unique broadcast ID corresponds to a latest broadcast commit message sent by the particular database server;

if the unique broadcast ID corresponds to a latest broadcast commit message, then
incrementing a received counter, wherein the receive number indicates the number of acknowledge messages received by the one or more other database servers;
determining whether the receive number equals an expected number, wherein the expected number represents the number of broadcast commit messages that where sent containing the unique broadcast ID; and
if the receive number equals the expected number, then completing the commit of the transaction.

3. A computer-readable medium carrying one or more sequences of one or more instructions for propagating commit times between a plurality of database servers that have access to a common database, wherein each of said plurality of database servers is associated with a logical clock, the one or more sequences of one or more instructions including instructions which, when executed by one or more processors, cause the one or more processors to perform the steps of:

in response to initiating a commit of a transaction executing on a particular database server of said plurality of database servers, performing the steps of
determining a commit time for said transaction; and
broadcasting said commit time to one or more other database servers of said plurality of database servers;

in response to receiving the commit time at a receiving database server of the one or more other database servers, causing the receiving database server to perform the steps of
comparing the commit time to a time indicated by the logical clock associated with the receiving database server; and
if the commit time is greater than the time indicated by the logical clock associated with the receiving database server, then setting the logical clock associated with the receiving database server to reflect a time that is at least as recent as the time reflected by the commit time;

after setting the logical clock associated with the receiving database server,
obtaining a snapshot time based on the logical clock associated with the receiving database server;
assigning the snapshot time to a second transaction executing on said receiving database server; and
using the snapshot time to obtain data for said second transaction from a database snapshot, wherein the database snapshot represents a snapshot of data contained in said common database as of a particular point in time.

4. A computer-readable medium carrying one or more sequences of one or more instructions for propagating commit times between a plurality of database servers that have access to a common database, wherein each of said plurality of database servers is associated with a logical clock, the one or more sequences of one or more instructions including instructions which, when executed by one or more processors, cause the one or more processors to perform the steps of:

in response to initiating a commit of a transaction executing on a particular database server of said plurality of database servers, performing the steps of
determining a commit time for said transaction; and
broadcasting said commit time to one or more other database servers of said plurality of database servers;

in response to receiving the commit time at a receiving database server of the one or more other database servers, causing the receiving database server to perform the steps of:
comparing the commit time to a time indicated by the logical clock associated with the receiving database server; and
if the commit time is greater than the time indicated by the logical clock associated with the receiving database server, then setting the logical clock associated with the receiving database server to reflect a time that is at least as recent as the time reflected by the commit time;

in response to receiving the commit time at the receiving database server, sending a message from the receiving database server to the particular database server to acknowledge the receipt of the commit time;

wherein the step of broadcasting the commit time to one or more other database servers, includes the step of sending a broadcast commit message to the one or more other database servers, wherein the broadcast commit message includes an unique broadcast ID that can be used to identify the broadcast commit message; and wherein the step of sending the message from the receiving database server to the particular database server includes the step of sending an acknowledge message from the receiving database server to the particular database server, wherein the acknowledge message includes the unique broadcast ID; and receiving an acknowledge message from the receiving database server; extracting the unique broadcast ID from the acknowledge message;

determining whether the unique broadcast ID corresponds to a latest broadcast commit message sent by the particular database server;

if the unique broadcast ID corresponds to a latest broadcast commit message, then
incrementing a received counter, wherein the receive number indicates the number of acknowledge messages received by the one or more other database servers;
determining whether the receive number equals an expected number, wherein the expected number represents the number of broadcast commit messages that where sent containing the unique broadcast ID; and
if the receive number equals the expected number, then completing the commit of the transaction.

5. A system for propagating commit times between a plurality of database servers that have access to a common database, wherein each of said plurality of database servers is associated with a logical clock, the system comprising:

a memory;
one or more processors coupled to the memory; and
a set of computer instructions contained in the memory, the set of computer instructions including computer instructions which when executed by the one or more processors, cause the one or more processors to perform the steps of:
in response to initiating a commit of a transaction executing on a particular database server of said plurality of database servers, performing the steps of
determining a commit time for said transaction; and
broadcasting said commit time to one or more other database servers of said plurality of database servers;
in response to receiving the commit time at a receiving database server of the one or more other database servers, causing the receiving database server to perform the steps of
comparing the commit time to a time indicated by the logical clock associated with the receiving database server; and
if the commit time is greater than the time indicated by the logical clock associated with the receiving database server, then setting the logical clock associated with the receiving database server to reflect a time that is at least as recent as the time reflected by the commit time;
after setting the logical clock associated with the receiving database server,
obtaining a snapshot time based on the logical clock associated with the receiving database server;
assigning the snapshot time to a second transaction executing on said receiving database server; and
using the snapshot time to obtain data for said second transaction from a database snapshot, wherein the database snapshot represents a snapshot of data contained in said common database as of a particular point in time.

6. A system for propagating commit times between a plurality of database servers that have access to a common database, wherein each of said plurality of database servers is associated with a logical clock, the system comprising:

a memory;
one or more processors coupled to the memory; and
a set of computer instructions contained in the memory, the set of computer instructions including computer instructions which when executed by the one or more processors, cause the one or more processors to perform the steps of:
in response to initiating a commit of a transaction executing on a particular database server of said plurality of database servers, performing the steps of
determining a commit time for said transaction; and
broadcasting said commit time to one or more other database servers of said plurality of database servers;
in response to receiving the commit time at a receiving database server of the one or more other database servers, causing the receiving database server to perform the steps of:
comparing the commit time to a time indicated by the logical clock associated with the receiving database server; and if the commit time is greater than the time indicated by the logical clock associated with the receiving database server, then setting the logical clock associated with the receiving database server to reflect a time that is at least as recent as the time reflected by the commit time;

in response to receiving the commit time at the receiving database server, sending a message from the receiving database server to the particular database server to acknowledge the receipt of the commit time;

wherein the step of broadcasting the commit time to one or more other database servers, includes the step of sending a broadcast commit message to the one or more other database servers, wherein the broadcast commit message includes an unique broadcast ID that can be used to identify the broadcast commit message; and wherein the step of sending the message from the receiving database server to the particular database server includes the step of sending an acknowledge message from the receiving database server to the particular database server, wherein the acknowledge message includes the unique broadcast ID; and receiving an acknowledge message from the receiving database server;

extracting the unique broadcast ID from the acknowledge message;

determining whether the unique broadcast ID corresponds to a latest broadcast commit message sent by the particular database server;

if the unique broadcast ID corresponds to a latest broadcast commit message, then incrementing a received counter, wherein the receive number indicates the number of acknowledge messages received by the one or more other database servers;

determining whether the receive number equals an expected number, wherein the expected number represents the number of broadcast commit messages that where sent containing the unique broadcast ID; and if the receive number equals the expected number, then completing the commit of the transaction.

* * * * *